Feb. 13, 1940.         C. D. MACGILL         2,190,569
OPTICAL SIGHTING APPARATUS
Filed Nov. 21, 1938          2 Sheets-Sheet 1
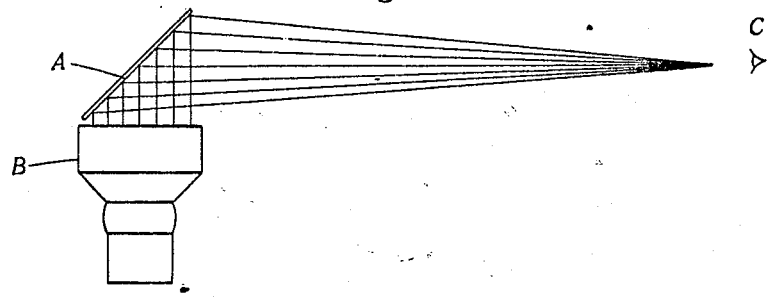
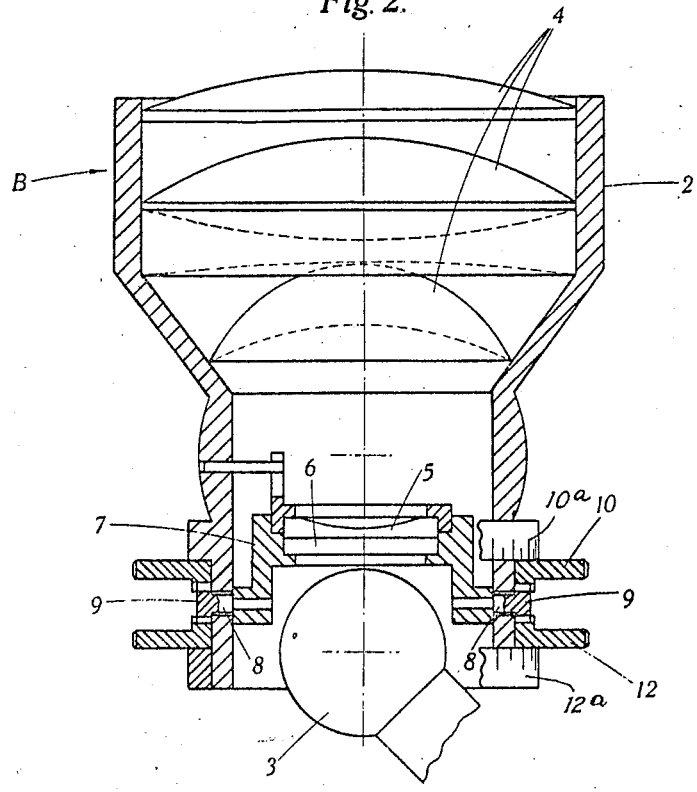
CHARLES DALRYMPLE MACGILL
INVENTOR
by E. H. Bond
attorney

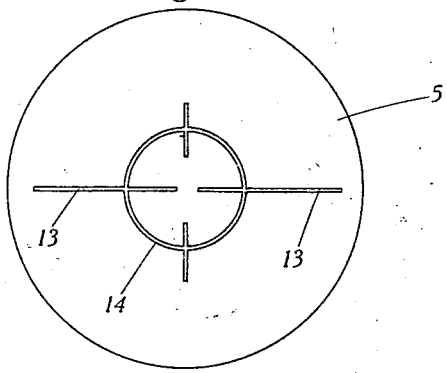
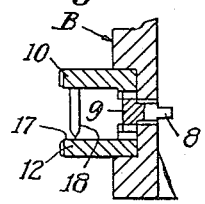
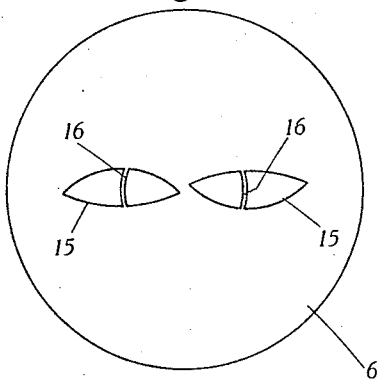
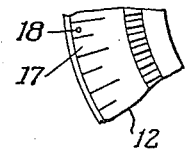
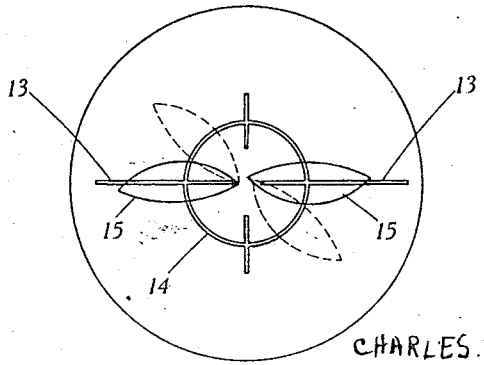

Patented Feb. 13, 1940

2,190,569

UNITED STATES PATENT OFFICE 2,190,569

OPTICAL SIGHTING APPARATUS

Charles Dalrymple Macgill, Anniesland, Glasgow, Scotland, assignor to Barr and Stroud, Limited, Anniesland, Glasgow, Scotland Application November 21, 1938, Serial No. 241,702
In Great Britain December 1, 1937

7 Claims. (Cl. 88—2.3)

This invention refers to optical sighting apparatus of the type in which the target is viewed by the observer through a transparent screen such as the windscreen of an aeroplane, which also serves as a reflector for presenting to the observer a reference image in the line of sight to the target, the principal object of the invention being to provide a sight of the transparent reflecting screen type which will operate as a range estimator, or for the estimation of base length of target, angle subtended by the target base, or course of target.

According to this invention, provision is made for setting two reference marks or points constituted by optical images (hereinafter termed marks) at varying distances apart in the field of view in which the target is seen, so that the marks define the angle subtended at the observer's eye by the target base, as indicated by the observer obtaining coincidence of the target base with the gap between the reference marks, the apparatus being calibrated so as then to give measurement of the subtended angle, range, or length of target base, as may be required, depending on the data used in setting. From the last of these, course of target can be estimated, as hereinafter explained.

In carrying the invention into practice, means may be provided for varying the distance apart of the reference marks by the application differentially of movement corresponding with two of the three factors, viz., range, length of target base, and subtended angle, and hence to obtain the value of the third factor. Thus, if the base length is known, then setting of the reference marks by the differential application of movement corresponding with base length and the further movement necessary to effect coincidence of the base with the gap between the marks gives a measure of range at the moment of observation; similarly, if the range is known, a measure of the base length can be obtained. Further, the magnitude of the angle subtended by the target is represented by the difference of the two movements applied in setting the reference marks. In addition, if the observed base length does not agree with the known base length it may be inferred that the target is lying at an angle and the value of this angle and, hence, the course of the target, can be estimated from the relationship between the observed base length and the known base length.

In a further application, if the marks are set by movement corresponding with base length and movement corresponding with selected range, then when the observer sees the target base coinciding with the gap between the reference marks, it is indicated that the selected range has been reached.

Variable markings may be provided, at or approximately at the focal plane of a collimating light projecting system, virtual images of which markings are produced in the line of sight of the observer by reflection at the screen, the distance apart of the images being variable in accordance with variation in the distance apart of the focal plane markings.

Variation of the distance apart of the reference marks is effected by members which are relatively movable, for example relatively rotatable, or relatively movable with a rectilinear motion. Thus, in one example, at or approximately at the focal plane of sighting apparatus of the transparent reflecting screen type, a first graticule has transparent markings on an opaque background and a second graticule, movable relative thereto, has opaque markings for masking to a greater or less extent the transparent markings, to produce variation in the distance apart of the image marks.

One example of construction will now be described with reference to the acompanying drawings, in which:

Figure 1 is a diagrammatic side view of the sight.

Figure 2 is a side view of the collimator system of the sight in section on the optical axis, Figures 3, 4 and 5 are plan views of details, and Figures 6 and 7 are fragmentary views corresponding with Figure 2.

The apparatus shown in Figure 1 comprises a transparent reflecting screen A and a collimator B, for producing a virtual reference image in the observer's line of sight, which image in consequence appears at an infinite distance to the eye, and apparently more or less coincident with the target, so eliminating parallax effects. The eye of the observer is indicated at C, observing the target directly through the screen A and also observing the reference image.

The collimator B, see Figure 2, comprises a casing 2, a lamp 3 at the lower end of the casing, a collimator lens system 4 at the upper part of the casing 2, a fixed graticule 5, and a graticule 6 rotatable about the axis of the collimator and situated face to face with the graticule 5, their adjacent faces being substantially in the focal plane of the system, both graticule plates being of glass, preferably of a heat-resisting quality. The graticule 6 is carried by an annular mounting 7 which has two short diametrically opposed spindles 8 projecting from it through slots in the casing 2, each spindle 8 having at its outer end a pinion wheel 9. Two annular operating heads 10 and 12 extend round the outside of the casing 2, about the axis of which they can rotate, each head having a ring of teeth to engage with the pinion wheels 9, one on the upper side and the other on the under side of the pinion wheels 9. This arrangement constitutes a differential gear whereby rotational movement which is the resultant of the rotational movement of the two heads 10 and 12 can be applied to the mounting 7 and thus to the graticule 6. The heads 10 and 12 are set in accordance with scales 10ª and 12ª suitably graduated to correspond with target base and range, the scales being, say, of logarithmic character and being, for example, on the collimator casing 2 alongside the heads 10 and 12.

Referring now to Figures 3, 4 and 5, Figure 3 shows the lower face of the graticule 5 bearing two separated diametrical line marks 13, and any other marking that may be found desirable for sighting purposes, such as a circular mark 14, these marks being transparent portions on an opaque background. To co-act with the marks 13 of graticule 5, the upper face of the graticule 6 has opaque masking wings on a transparent background, see Figure 4. Figure 5 is a plan view showing the graticule 5 in position above the graticule 6. In order that the transparent circular mark 14 should always appear complete, there are transparent arcs 16 in the masking wings 15.

In use, assuming it is desired to conserve gunfire until the target has closed to a selected range, the observer sees the target, for example, an aeroplane, directly through the screen A, and knowing its wing span, or other dimension which is to be the base of observation, and the range to which it is desired to close before opening fire, he turns one of the rings, say the ring 10, to correspond with the target base factor and turns the ring 12 to correspond with the range factor. The effect of this is to cause relative rotation of the graticules 5 and 6 with the result that the masking wings 15 of the lower graticule mask the lines 13 of the upper graticule to an extent corresponding with these two factors, so that there appears in the line of sight a luminous image of the two lines 13, or of portions of these lines, separated by a distance which corresponds with the target base and the selected range, and thus the inner extremities of the image lines define the angle subtended by the target at the selected range. The target is seen between the image lines and when the base coincides with the extremities of the image lines, the target is at the selected range.

The relative movement of the heads 10 and 12 is a measure of subtended angle, and values of subtended angle can be indicated, if desired, by providing an index on one of the heads and an additional scale, graduated in angular values, on the other head. Such an arrangement is shown in Figures 6 and 7 which are, respectively, a vertical section and a sectional plan of the left hand lower part of the apparatus shown in Figure 2. On the upper face of the lower head 12 there is a scale 17, with which a pointer 18 projecting down from the head 10 co-operates.

The graticules 5 and 6 may be made by etching the surfaces of the glass plates where they are to be opaque and coating the etched parts with an opaque heat-resisting substance.

I claim:

1. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a collimating light projecting system having at or near its focal plane reference markings which are variable in their distance apart and virtual images of which are produced in the observer's line of sight by reflection at the screen, setting mechanism for varying the distance apart of said reference markings and thus varying the distance apart of their images in the field of view to define the angle subtended at the observer's eye by the target base, as indicated by the observer obtaining coincidence of the target base with the gap between the reference images, and scale means associated with the setting mechanism enabling movement of known value corresponding with range of target or base length of target or both, to be imparted to the reference mark setting mechanism in defining the subtended angle, and also serving to give readings of either of these values which may be unknown.

2. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a collimating light projecting system having at or near its focal plane reference markings which are variable in their distance apart and virtual images of which are produced in the observer's line of sight by reflection at the screen, setting mechanism for varying the distance apart of said reference markings and thus varying the distance apart of their images in the field of view to define the angle subtended at the observer's eye by the target base, as indicated by the observer obtaining coincidence of the target base with the gap between the reference images, a scale of range values, a scale of target base length values, means operating in conjunction with the scale of range values for applying movement to the setting mechanism, and means operating in conjunction with the scale of target base length values for applying movement to said setting mechanism, the setting mechanism including differential gearing for combining the movement applied by said two operating means and applying it to vary the distance apart of the reference images, for the purpose set forth.

3. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a collimating light projecting system having at or near its focal plane a first graticule with transparent markings on an opaque background and a second graticule movable relative thereto and having opaque markings for masking to a greater or less extent the transparent markings, virtual images of which transparent markings are produced in the observer's line of sight by reflection at the screen, said images being variable in their distance apart by relative movement of the graticules to define the angle subtended at the observer's eye by the target base, as indicated by the observer obtaining coincidence of the target base with the gap between the reference images, setting mechanism for effecting relative movement of the graticules and thus varying the distance apart of the reference images, and scale means associated with the setting mechanism enabling movement of known value corresponding with range of target or base length of target, or both, to be imparted to the reference mark setting mechanism in defining the subtended angle, and also serving to give readings of either of these values which may be unknown.

4. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a collimating light projecting system having at or near its focal plane a first graticule with transparent markings on an opaque background and a second graticule movable relative thereto and having opaque markings for masking to a greater or less extent the transparent markings, virtual images of which transparent markings are produced in the observer's line of sight by reflection at the screen, the reference images being variable in their distance apart by relative movement of the graticules to define the angle subtended at the observer's eye by the target base, as indicated by the observer obtaining coincidence of the target base with the gap between the reference images, setting mechanism for effecting relative movement of the graticules and thus varying the distance apart of the reference images, a scale of range values, a scale of target base length values, means operating in conjunction with the scale of range values for applying movement to the reference mark setting mechanism, and means operating in conjunction with the scale of target base length values for applying movement to said setting mechanism, the setting mechanism including differential gearing for combining the movement applied by said two operating means, and for applying it to effect relative movement of the graticules to vary the distance apart of the reference images, for the purpose set forth.

5. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a collimating lens system, a lamp for projecting light through the collimating lens system, at or near the focal plane of the lens system a first graticule having transparent markings on an opaque background and a second graticule rotatable relative thereto provided with opaque markings for masking to a greater or less extent the transparent markings, virtual images of which transparent markings are produced in the observer's line of sight by reflection at the screen, said images being variable in their distance apart to define the angle subtended at the observer's eye by the target base, as indicated by the observer obtaining coincidence of the target base with the gap between the reference images, a scale of range values, a scale of target base length values, a rotatable operating head in conjunction with the scale of range values for applying movement corresponding with range value, a rotatable operating head in conjunction with the scale of target base length values for applying movement corresponding with target base length value, and differential gearing for combining the movement applied by the two operating heads and applying it to effect relative rotation of the graticules to vary the distance apart of the reference images, for the purpose set forth.

6. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a collimating light projecting system having at or near its focal plane a first graticule with transparent markings on an opaque background and a second graticule movable relative thereto and having opaque markings for masking to a greater or less extent the transparent markings, virtual images of which transparent markings are produced in the observer's line of sight by reflection at the screen, the reference images being variable in their distance apart by relative movement of the graticules to define the angle subtended at the observer's eye by the target base, as indicated by the observer obtaining coincidence of the target base with the gap between the reference images, a logarithmic scale of range values, a logarithmic scale of target base length values, means operating in conjunction with the scale of range values for applying movement to the reference mark setting mechanism, and means operating in conjunction with the scale of target base length values for applying movement to said setting mechanism, the setting mechanism including differential gearing for combining the movement applied by said two operating means and for applying it to effect relative movement of the graticules to vary the distance apart of the reference images, for the purpose set forth.

7. Optical sighting apparatus of the transparent reflecting screen type, i. e. having a transparent screen through which the target under observation is viewed by the observer and which also serves as a reflector for presenting to the observer a reference image in the line of sight to the target, the apparatus comprising a light projecting system, variable reference markings a virtual image of which is produced in the observer's line of sight by reflection at the screen and by light from the light projecting system, the image constituting two reference marks, setting mechanism for varying said reference markings and thus varying the distance apart of the reference images in the field of view to define the angle subtended at the observer's eye by the target base, as indicated by the observer obtaining coincidence of the target base with the gap between the reference images, and scale means associated with the setting mechanism enabling movement of known value corresponding with range of target, or base length of target, or both, to be imparted to the reference mark setting mechanism in defining the subtended angle, and also serving to give readings of either of these values which may be unknown.

CHARLES DALRYMPLE MACGILL.